United States Patent [19]
Maeshima

[11] Patent Number: 4,887,163
[45] Date of Patent: Dec. 12, 1989

[54] IMAGE PROCESSING APPARATUS

[75] Inventor: Katsuyoshi Maeshima, Yokohama, Japan

[73] Assignee: Canon Kabushiki Kaisha, Tokyo, Japan

[21] Appl. No.: 325,104

[22] Filed: Mar. 20, 1989

Related U.S. Application Data

[62] Division of Ser. No. 82,660, Aug. 7, 1987, abandoned.

[30] Foreign Application Priority Data

Aug. 14, 1986 [JP] Japan ................... 61-191483
Aug. 14, 1986 [JP] Japan ................... 61-191484

[51] Int. Cl.$^4$ ............................................. H04N 1/40
[52] U.S. Cl. ................................... 358/443; 358/464; 358/456
[58] Field of Search ............... 358/280, 256, 285, 287, 358/283, 282

[56] References Cited

U.S. PATENT DOCUMENTS 4,517,606  5/1985  Yokomizo et al. ............... 358/280
4,786,974  11/1988  Ina ..................................... 358/257
4,814,893  3/1989  Katoh ................................ 358/296

FOREIGN PATENT DOCUMENTS 3510763  9/1985  Fed. Rep. of Germany .
3515226  10/1985  Fed. Rep. of Germany .

Primary Examiner—Edward L. Coles, Sr.
Attorney, Agent, or Firm—Fitzpatrick, Cella, Harper & Scinto

[57] ABSTRACT

An image processing apparatus capable of various image processings with a simple circuit structure is disclosed. Corresponding to input image data of plural pixels, there are generated process data representing plural image process conditions, and the input image data are processed according to the process data.

21 Claims, 14 Drawing Sheets

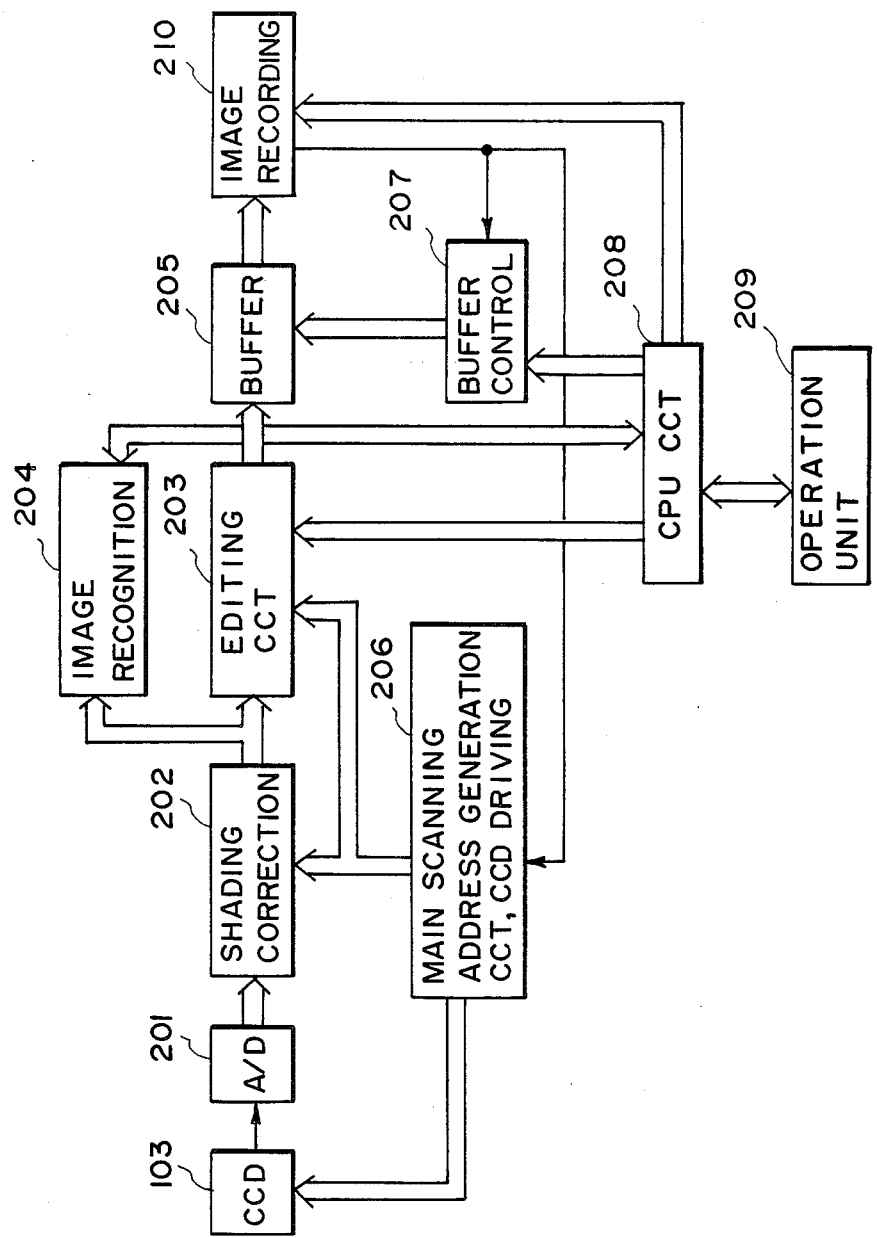
F I G. 2

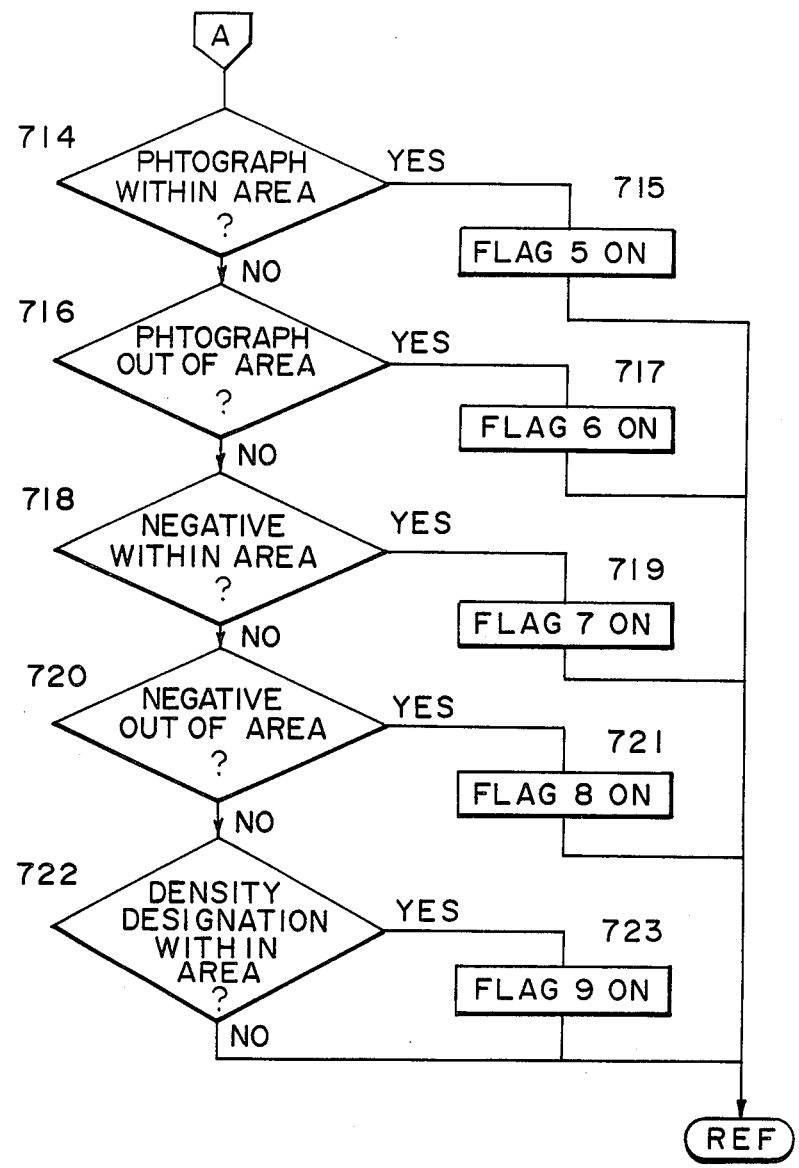
FIG. IIB

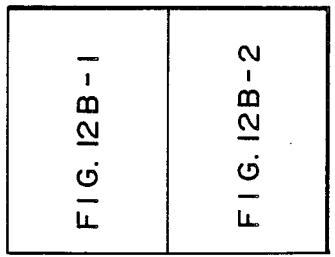
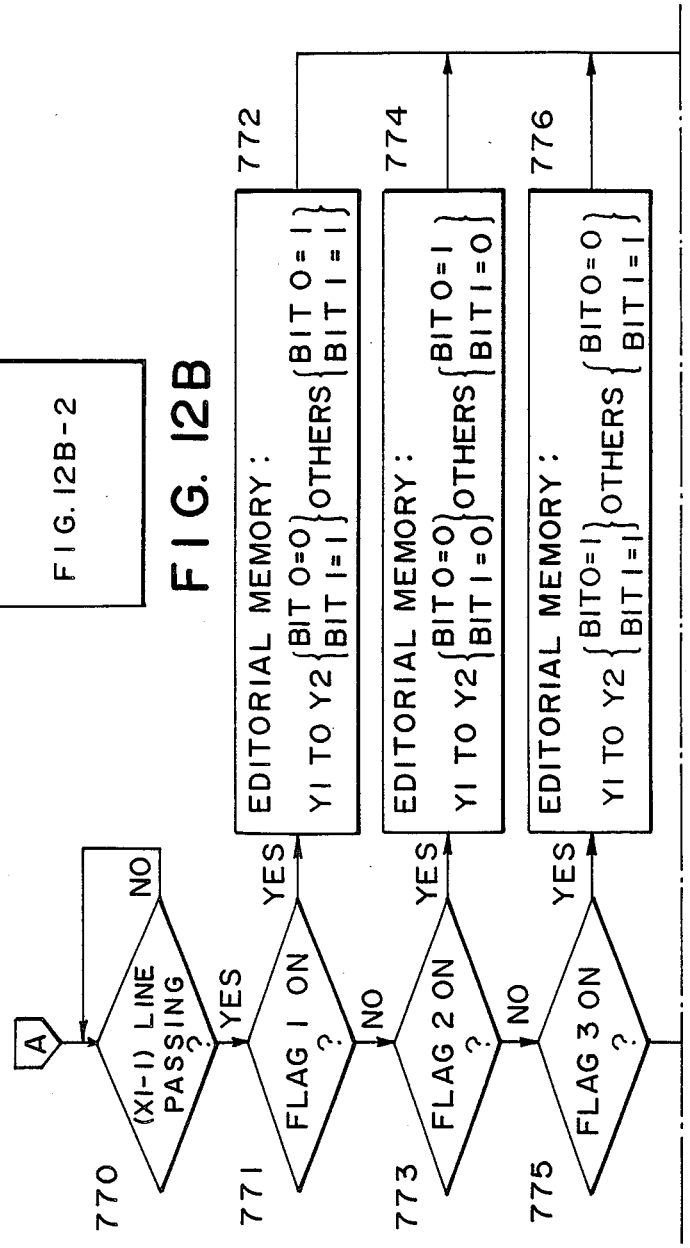

IMAGE PROCESSING APPARATUS

This application is a continuation-in-part of application Ser. No. 082,660, filed Aug. 7, 1987 now abandoned.

BACKGROUND OF THE INVENTION

1. Field of the Invention

The present invention relates to an image processing apparatus for processing or converting image data obtained by reading an original image.

2. Related Background Art

Conventional image processing apparatus for processing or converting image data obtained by reading an original image employs a microcomputer for executing such processing or conversion. Because of a limitation in the processing speed of such microcomputer, it has been difficult to release, at high speed, information processed on real-time basis for each pixel.

The present applicant has therefore already proposed image processing apparatus capable of highspeed real-time image processing, for example in U.S. patent applications Ser. No. 654,039, Ser. No. 942,035, etc.

The apparatus disclosed in these patent applications are designed to collectively preset, on a hardware, the information of a main scanning line or plural main scanning lines to be processed, and to effect processes corresponding to each pixel on a hardware.

More specifically the addresses of changing points of process conditions in each editing process are memorized and are constantly compared with the main scanning address by comparators, and a desired editing process is conducted when coincidence is found in said comparison.

However, in such apparatus, an increase in the number of image areas and in the species of processing in each main scanning line results in an increase in the number of changing points, and the number of comparators is accordingly increased.

As an example, in case eight different processes are effected for each main scanning lines of 5,000 pixels and each process has ten changing points, there will be required 8×10=80 sets of a comparator and a 13-bit register, so that the hardware circuit shows a drastic increase in its magnitude.

SUMMARY OF THE INVENTION

In consideration of the foregoing, an object of the present invention is to provide an image processing apparatus capable of effecting various image processings at a high speed, without complication in the structure.

Another object of the present invention is to provide an image processing apparatus capable of efficiently effecting an arbitrary image processing in each image area.

Still another object of the present invention is to provide an image processing apparatus comprising means for entering image data representing each of plural pixels; means for forming process data representing plural image processing conditions corresponding to each pixel or consecutive plural pixels of image data; and process means for processing image data of each pixel entered from said entering means according to the process data formed by said forming means.

Still another object of the present invention is to provide an image processing apparatus capable of designating a desired area in the original image and effecting desired image processings inside and outside said area, with a simple structure.

The foregoing and still other objects of the present invention, and the advantages thereof, will become fully apparent from the following description.

BRIEF DESCRIPTION OF THE DRAWINGS

FIG. 2 is a block diagram of said image processing apparatus;

FIGS. 11A, 11B, 12A and 12B are flow charts showing control sequence of CPU.

DETAILED DESCRIPTION OF THE PREFERRED EMBODIMENTS

Figure 1:
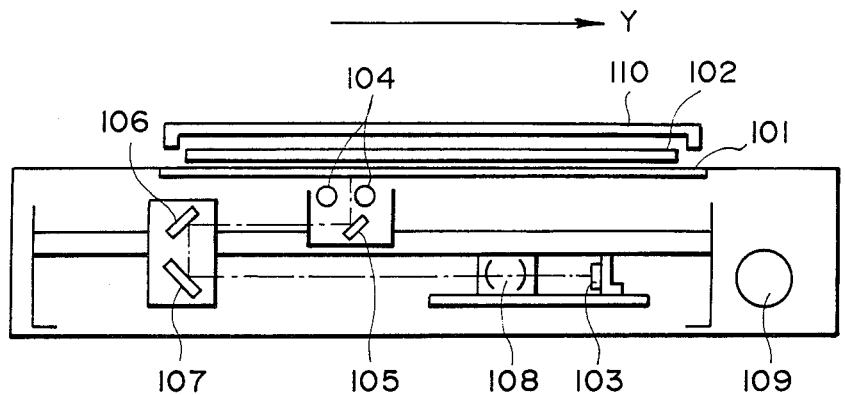
FIG. 1 is an external view of an image processing apparatus.

FIG. 1 is an external view of the image processing apparatus, provided with an original support table 101; an original cover 102; a CCD line sensor 103 consisting of a linear array of ca. 5,000 photosensors for image reading; a fluorescent lamp 104 for illuminating the original image; mirrors 105, 106, 107; and an imaging lens 108. A first optical unit provided with the fluorescent lamp 104 and the mirror 105, and a second optical unit provided with the mirrors 106, 107 are moved at a speed ratio of 2:1 to scan the original image in the Y-direction, thereby focusing the image of the original onto the CCD 103.

Figure 12A:
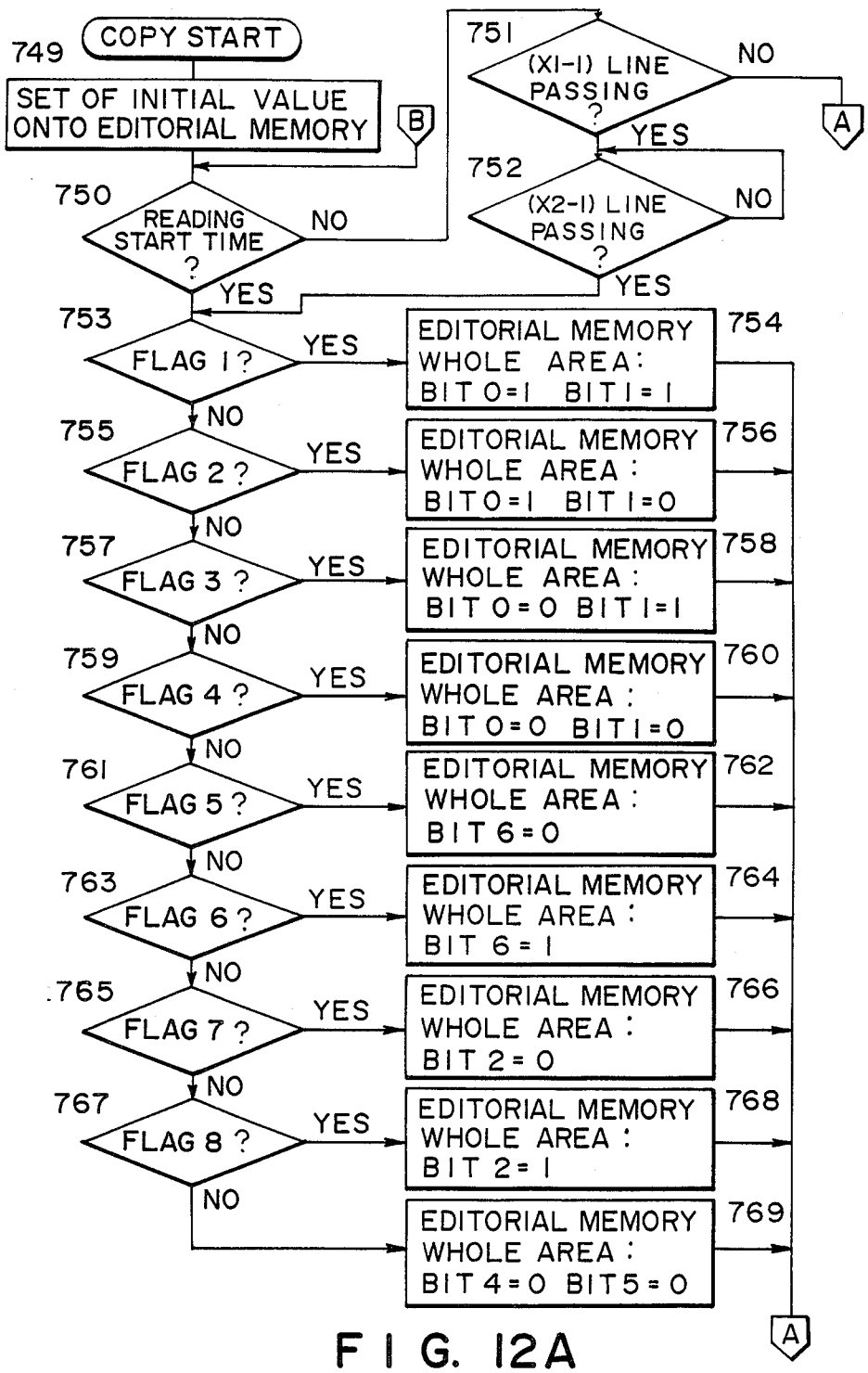
Figures 2, 12B:
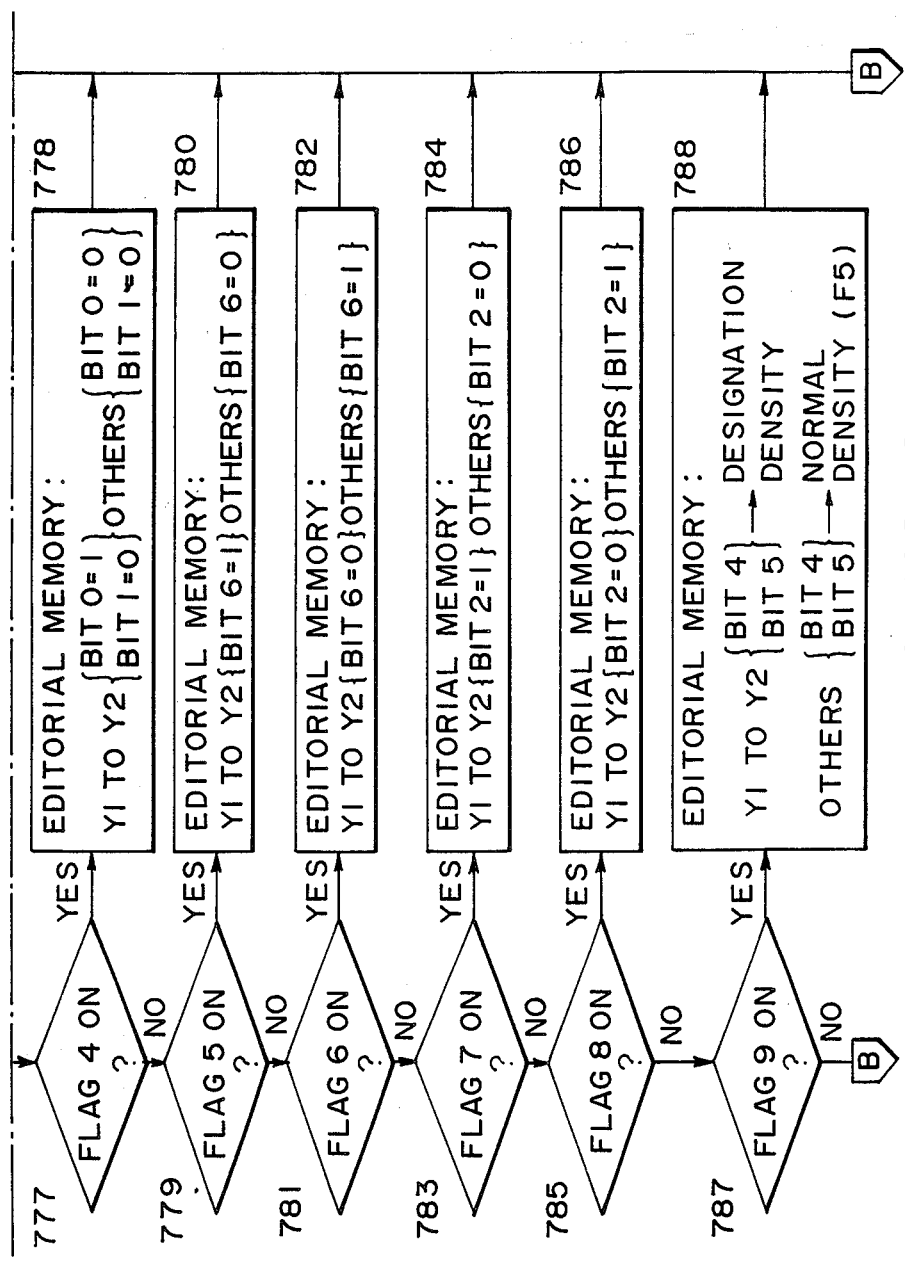

FIG. 2 is a block diagram of the circuit of the image processing apparatus shown in FIG. 1.

The CCD 103 (for example Toshiba TCD106C; 5,000 pixels) receives the light from the original, indicating the density of each pixel, and serially releases analog signals. Said analog signals are converted, in succession, by an 8-bit A/D converter 201, into digital signals of 8 bits per pixel, which are then corrected by a shading correction circuit 202.

The shading correction circuit 202 stores, in a memory, data of a main scanning line obtained by bringing the optical system outside the area of the original image and reading a white board provided there with the CCD 103, and corrects the actual image data based on thus memorized data. The data after shading correction are supplied to an image recognition unit 204 and an editing circuit 203. There are also provided a buffer 205, a main scanning address generator-CCD driver 206, a buffer control circuit 207, a CPU 208, and an operation unit 209, and the image data from the buffer 205 are supplied to an external device such as an image recording unit 210.

Figure 3:
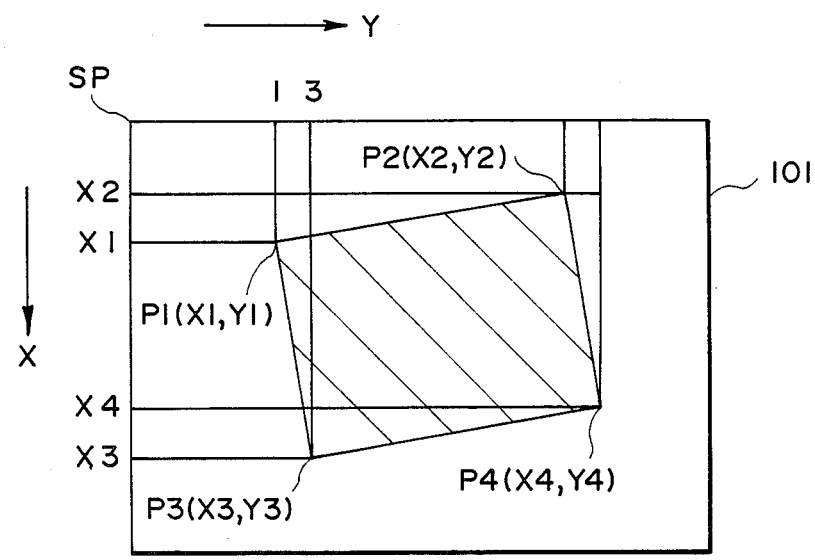
FIG. 3 is a schematic view of a state in which an original document is placed on an original support.

FIG. 3 shows a state in which an original document is placed on the original support table 101 of the apparatus.

Based on a reference point SP on the original support table 101, the main scanning direction X is defined in the direction of array of the CCD 103, and the sub scanning direction Y is defined in the moving direction of the first and second optical units. Said optical units are moved for pre-scanning, prior to the reading of the original image, in order to detect points P1(X1, Y1), P2(X2, Y2), P3(X3, Y3) and P4(X4, Y4) by the image recognition unit 204. The original cover is formed reflective, in order to obtain black data from the area outside the original document. Said prescanning is conducted by the main and sub scanning operations in such a manner as to cover the entire area of the original support glass plate.

Figure 4:
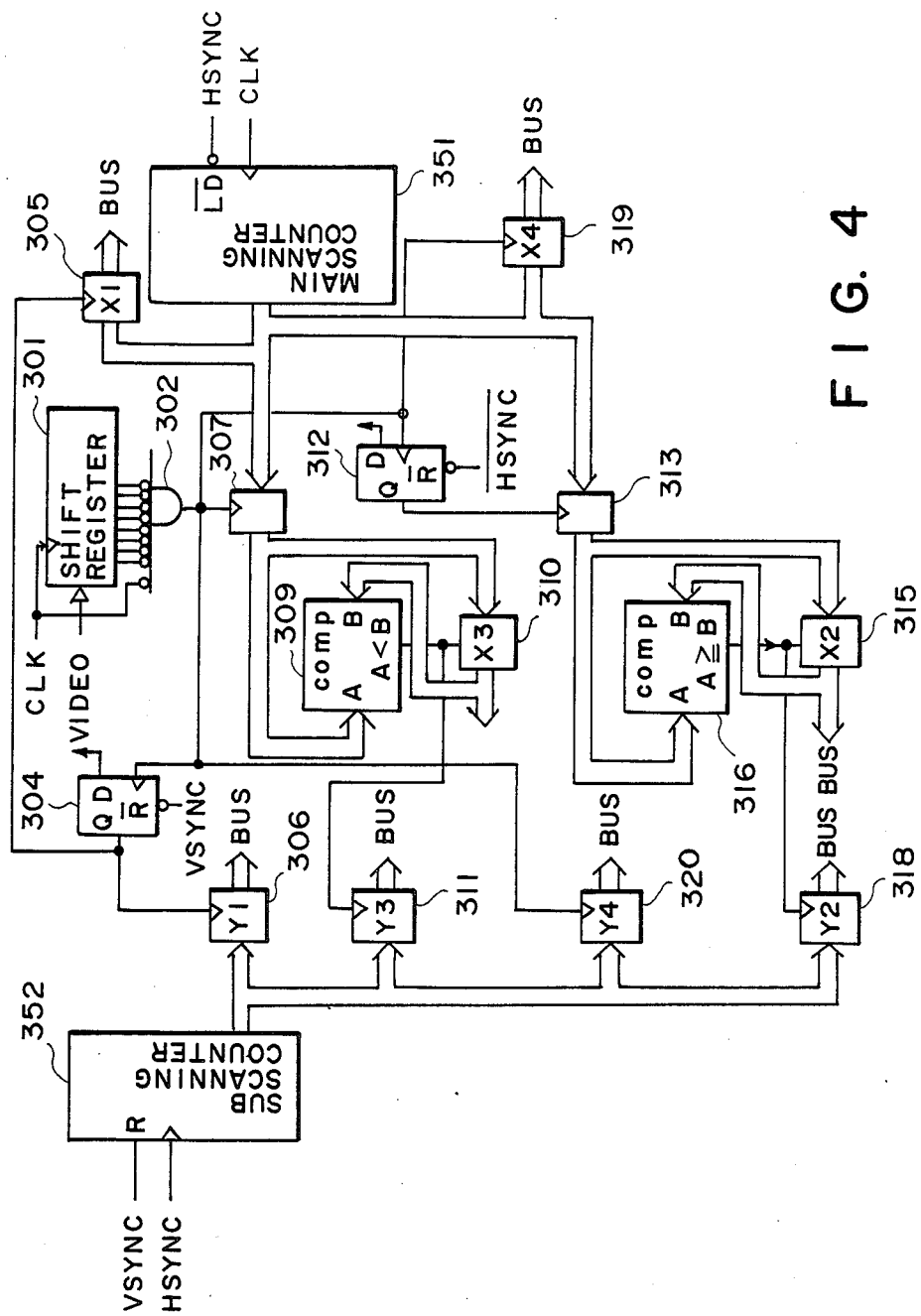
FIG. 4 is a block diagram of an image recognition unit.

FIG. 4 is a block diagram showing the details of the image recognition unit 204.

A main scanning counter 351 is composed of a down counter and indicates the scanning position in a main scanning line. Said counter 351 is set to a maximum value in the main scanning direction X in response to a horizontal synchronization signal HSYNC generated prior to each main scanning operation, and counts downwards by image data clock pulses CLK, thus indicating the pixel position in the main scanning direction.

A sub scanning counter 352, composed of an up counter, is reset to "0" at the start of an image front end signal VSYNC of which logic level is shifted up during the sub scanning operation, and counts upwards by the HSYNC signals, thus indicating the scanning position in the sub scanning direction.

In the scanning operation, image data VIDEO, obtained after shading correction by the shading correction circuit 202 and after binary encoding with an unrepresented comparator, are supplied to an 8-bit shift register 301. In each scanning, the CPU 208 provides said comparator with a fixed slice level determined in advance.

After the input of 8 bits, a gate 302 discriminates whether all of 8 bits in the shift register 301 are white signals "0" representing the background of the image, and, if so, releases a signal "1".

After the start of pre-scanning, a flip-flop 304, which is reset in advance by the image front-end signal VSYNC, is set when eight consecutive white "0" bits are detected at first. Said set state is retained until the next VSYNC signal. The main scanning counter 351 counts downwards by the clock pulses CLK synchronized with the pixel output signals from the comparator, and the value of said counter 351 is loaded in a latch 305 when the flip-flop 304 is set, and said loaded value is the coordinate X1.

The sub scanning counter 352 counts upward the signals synchronized with scanning lines, and the value of said counter 352 is loaded in a latch 306 when the flip-flop 304 is set, and said loaded value indicates the coordinate Y1. The point P1(X1, Y1) is determined in this manner.

Also each time the gate 302 releases a signal "1", the value of the main scanning counter 351 is loaded in a latch 307. When the value of the main scanning counter 351 is loaded in the latch 307 in response to the first detection of eight consecutive white pixels, said value is compared, in a comparator 309, with the value of a latch 310, which is set at the maximum value in the X-direction in response to the VSYNC signal.

If the value of the latch 307 is smaller, the output of the comparator 309 is activated to load the value of the latch 307 into the latch 310. At the same time the value of the sub scanning counter 352 is loaded in a latch 311.

This operation is completed before the entry of succeeding 8 bits into the shift register 301.

In this manner the comparison of values of the latches 307 and 310 is conducted over the entire image area. As the result the latch 310 holds the minimum value of the image area in the X-direction, and the latch 311 holds a corresponding Y-coordinate. Since the main scanning counter is a down counter, the minimum value in the X-direction indicates a point farthest from the reference point SP. In this manner the point P3(X3, Y3) is determined.

A flip-flop 312, which is reset by the horizontal synchronization signal HSYNC, is set in response to the first detection of eight consecutive white signals and remains set until the succeeding HSYNC signal. At said setting of the flip-flop 312, the value of the main scanning counter 351, corresponding to the first white signal in a line, is loaded in a latch 313, and said loaded value is compared, by a comparator 316, with the value of a latch 315 which is preset to the minimum value "0" in the X-direction, in response to the VSYNC signal.

If the value of the latch 315 is equal to or smaller than that of the latch 313, the output of the comparator 316 is activated whereby the value of the latch 313 is loaded in the latch 315. This operation is completed between two successive HSYNC signals.

The above-explained comparison is conducted over the entire image area, whereby the latch 315 holds the maximum coordinate of the image area in the X-direction, or the X-coordinate of the white signal closest to the scanning start point (X2). Also when the output of the comparator 316 is activated, the value of the sub scanning counter 352 is loaded in a latch 318, indicating the coordinate Y2. The point P2(X2, Y2) is thus determined.

In response to each detection of eight consecutive white pixel signals over the entire image area, the value of the main scanning counter 351 and that of the sub scanning counter 352 are respectively loaded in the latches 319 and 320. Consequently, at the completion of the pre-scanning of the original, the latches 319, 320 retain the values of the counters 351, 352 when eight consecutive white signals are detected last, corresponding to the point P4(X4, Y4).

The data lines of said eight latches 306, 311, 320, 318, 305, 310, 315 and 319 are connected to the bus of the CPU 208, which thus reads these data at the completion of forward motion of the optical system in the pre-scanning. In this manner the position and size of the original image on the original support table 101 are identified.

Figure 5:
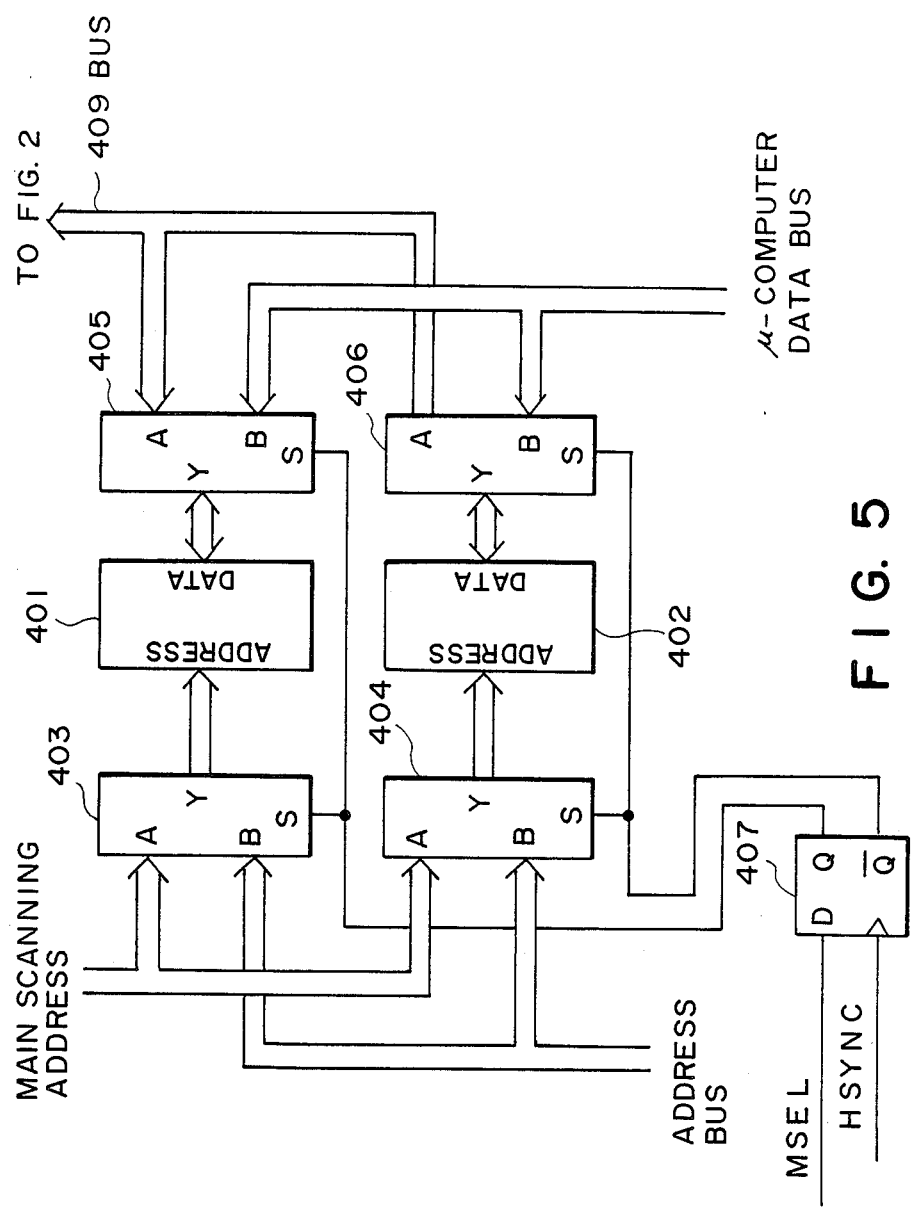
FIGS. 5 and 6 are block diagrams of an editing circuit.
Figure 6:
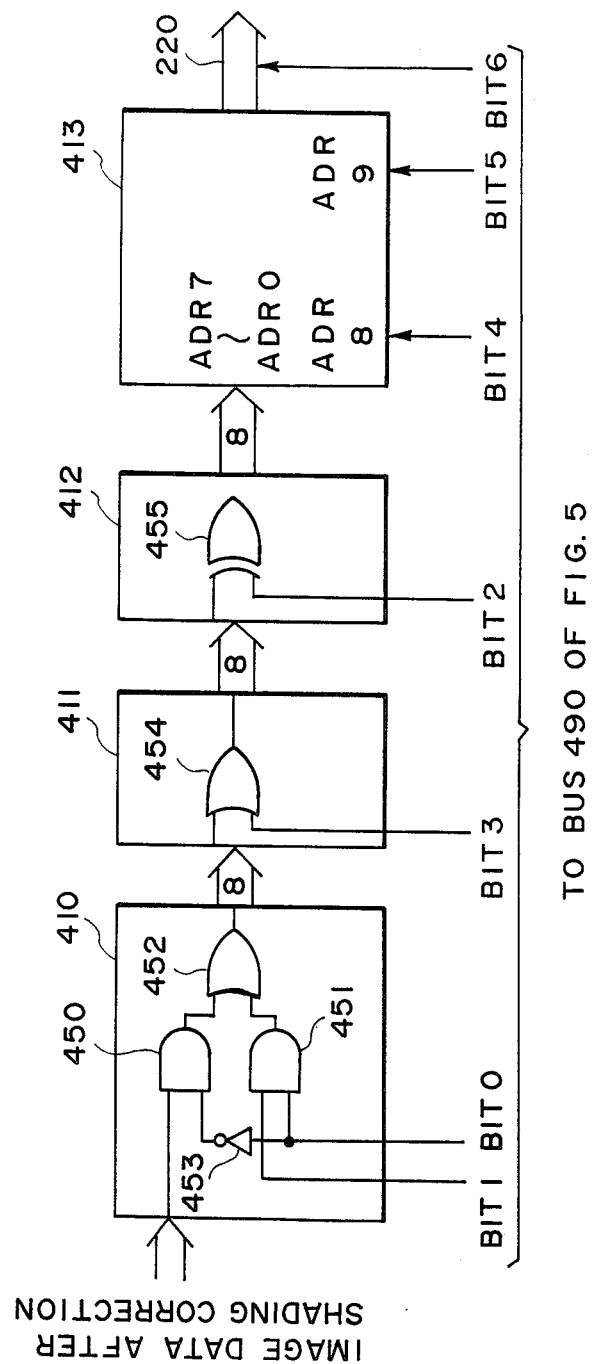

FIGS. 5 and 6 are circuit diagrams showing the details of the editing circuit 203 shown in FIG. 2. Editing memories 401, 402 are composed of RAM's for storing image editing data for executing desired image processing instructed by the operation unit 209. In response to an H-level memory select signal MSEL, selectors 403, 405 select terminals A, whereby the editing memory 401 is controlled by CCD address (main scanning address) from the main scan address generator 206. At the same time selectors 404, 406 select terminals B, whereby the editing memory 402 is controlled by microcomputer address. In this state the editing memory 402 is connected to the address bus and the data bus of the CPU 208, and can therefore be freely read and written by the CPU.

When the editing memories 401, 402 are connected to the CCD address, the addresses of said memories correspond to the pixel addresses of the CCD 103. More specifically the memory address 1 corresponds to the 1st pixel of the CCD, and the memory address n corresponds to the n-th pixel. Thus, in order to use a CCD of 5,000 pixels, there is employed an editing memory of at least 5,000 addresses, for example a memory of 8 KByte (8 Kbit×8). Thus the process data for processing an m-th pixel are written in the m-th address of the image memory.

The editing memories 401, 402 has a capacity of 8 bits per address, and, in the present embodiment, each at address is stored image editing data having eg., the following content: "image output disabled" in bit 0; "black output in image output disabled area" in bit 1; "negative" in bit 2; "black output" in bit 3; "gamma correction level" in bits 4 and 5; "photograph area" in bit 6; and "AE area" in bit 7.

In the following there will be explained an example of image editing data set in the editing memory 401 or 402 by the CPU 208, while making reference to FIGS. 8 and 9.

Figure 8:
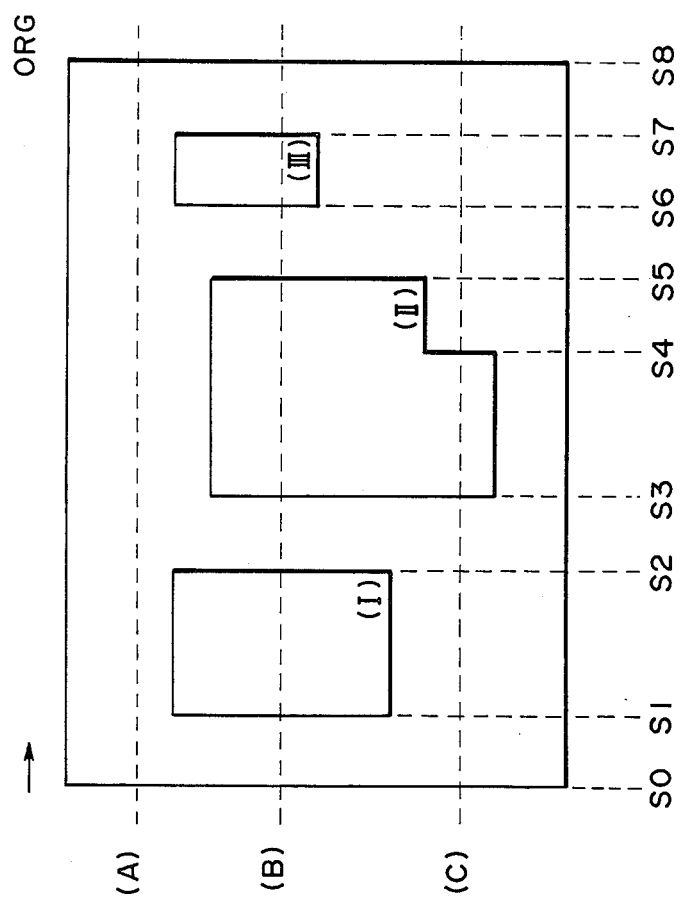
FIG. 8 is a view showing an example of area-division processing of an original.
Figure 9:
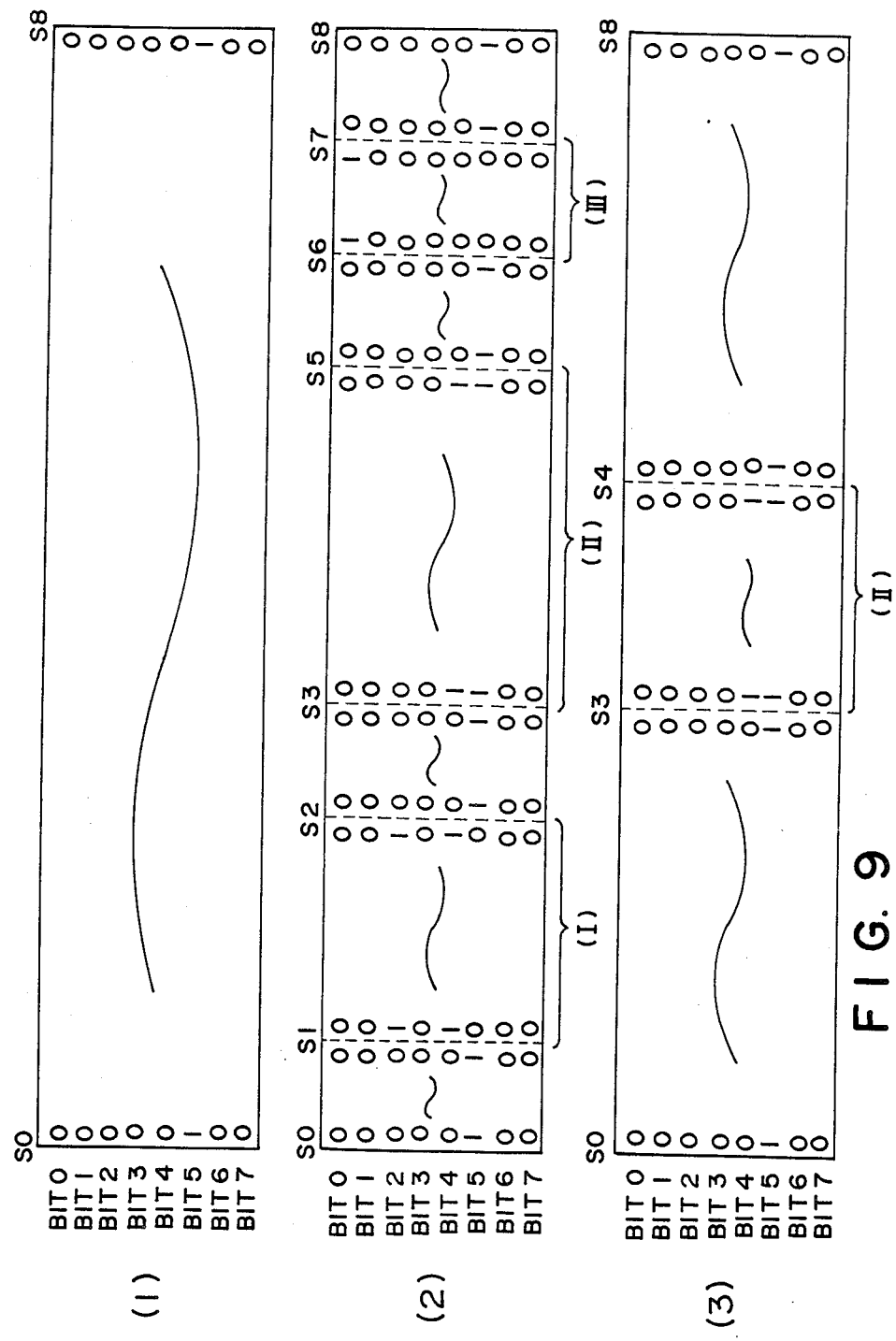
FIG. 9 is a chart showing an example of image editing data in the example shown in FIG. 8.

FIG. 8 illustrates the image processing on an original image ORG. Three arbitrary areas (I), (II) and (III) are designated by the operator through the operation unit 209. It is assumed that the image of the area (I) is subjected to a white-black inversion and a second gamma correction, that the image of the area (II) is subjected to a third gamma correction and a photographic process, and that the image of the area (III) is subjected to a white masking. S0 to S8 indicate the pixel positions in the main scanning direction.

According to the above-explained instructions, the CPU 208 forms the image editing data for the image signals of each scanning line, and stores said data in the editing memories 401, 402. A first gamma correction is to be applied to the image area other than the areas (I), (II) and (III). FIG. 9(1), (2) and (3) indicate image editing data to be set in the editing memories corresponding to scanning lines (A), (B) and (C) shown in FIG. 8. The image editing data for the area other than (I), (II), (III) are "00000100"; data for the area (I) are "00101000"; data for the area (II) are "00001110"; and data for the area (III) are "10000000"; and these data are stored in the positions S0-S8 in the main scanning direction. In FIG. 9 same data are not repeated but simply indicated by ondulating lines, for the purpose of simplicity.

There are provided two editing memories 401, 402, in order to use one for microcomputer access and the other for CCD address access alternately by shifting the level of the memory select signal MSEL at every line or every several lines. Thus, while information on editing is stored in one of the editing memories which is in the microcomputer access mode, the information read from the other memory are supplied to the but 409 for editing the image obtained from the CCD.

The image editing data can be altered by a shift from an editing memory in the CCD address access mode to the other memory storing new editing data, through the shift in level of the MSEL signal. Thus the image editing data can be altered for every line, in most frequent case, by altering the level of the MSEL signal in every line. On the other hand, if the MSEL signal is not changed, so that the image editing data are not changed, same image editing data in a same memory are repeatedly used.

In the following there will be explained the function procedure of the CPU 208 concerning the formation of image editing data.

Figure 10:
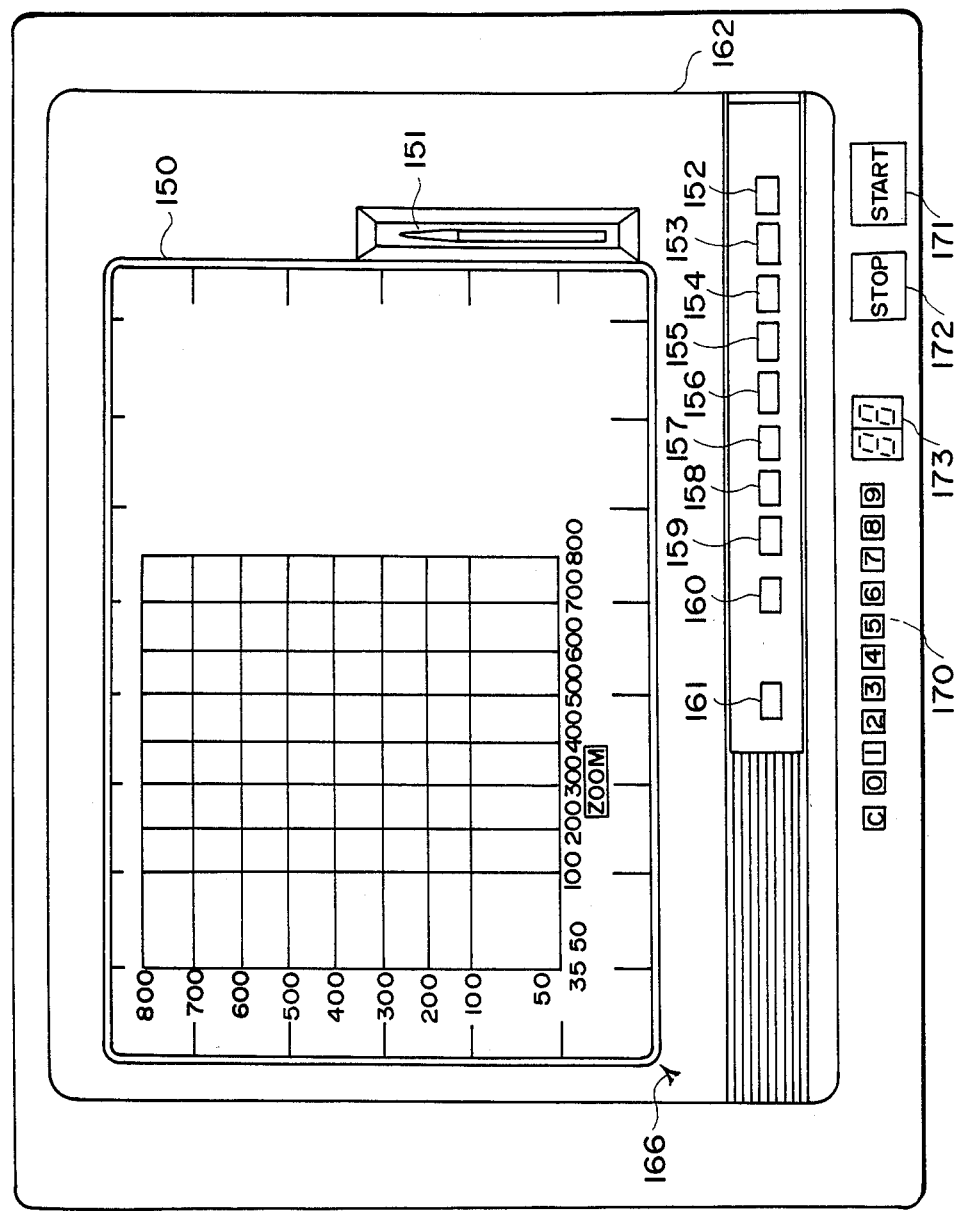
FIG. 10 is an external view of an operation unit.

FIG. 10 is an external view of the operation unit 209, composed of an editing condition input unit and a digitizer unit 162 for entering editing coordinates, provided on the original cover 102. By depressing a point on a coordinate input unit 150 of the digitizer unit 162 with a pointing pen 151, the X- and Y-coordinates measured from a reference point 166 are supplied to the CPU 208. Also keys 152-161 for entering various editing conditions, when depressed with the pointing pen 151, transmit corresponding editing conditions to the CPU 208. On the upper face of the apparatus and outside the original cover 102, there are provided numeral keys and a clear key 170 for entering numbers; a display unit 173 for displaying numerical data; a start key 171 for starting an image reading operation; and a stop key 172 for interrupting the image reading operation, and the information from said keys are also transmitted to the CPU 208.

FIGS. 11A, 11B, 12A and 12B are flow charts of the control sequence of the microcomputer of the CPU 208 relating to the formation of the image editing data, and corresponding programs are stored in advance in a read-only memory incorporated in the microcomputer.

Figure 11A:
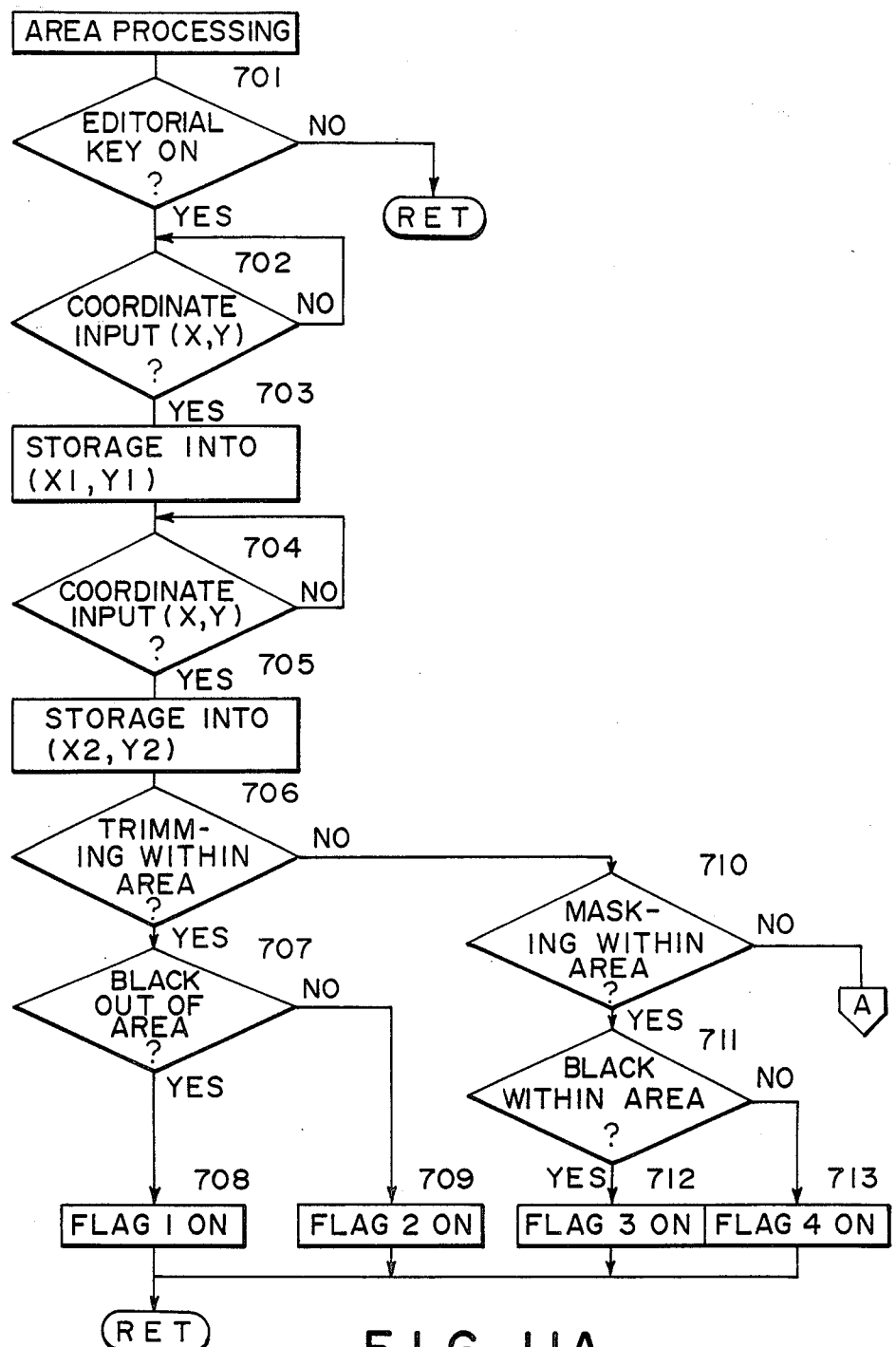

FIGS. 11A and 11B are flow charts of the control sequence for discriminating the inputs from the digitizer unit 162.

When any of the keys 152-160 of the digitizer unit 162 is actuated, a step 701 identifies such key actuation, and data indicating an editing condition corresponding to the actuated key are stored in a random access memory (RAM) incorporated in the CPU 208. Then, when the pointing pen 151 depresses two points on the diagonal corners of a desired rectangular area on the coordinate input unit 150, steps 702-705 store the coordinate (X1, Y1) and (X2, Y2) representing said two points in said RAM memory.

Subsequently steps 706-723 discriminate the editing condition of the actuated editing key 152-160, and set flags 1-9 according to said condition.

More specifically, the sequence proceeds from a step 706 to 707 if an area trimming key 152 or 153 is actuated, and a step 708 sets the flag 1 if the key 152 for black output outside the trimmed area is actuated. On the other hand, if the key 153 for white output outside the trimmed area is actuated, a step 709 sets the flag 2.

In case an area masking key 154 or 155 is actuated, the sequence proceeds from a step 706 or 710 to a step 711. If the actuated key is the black masking key 154, a step 712 sets the flag 3, but, if it is the white masking key 155, a step 713 sets the flag 4.

In case a key 156 for processing the designated area in a photographic mode is actuated, the sequence proceeds from a step 706, 710, or 714 to a step 715 to set the flag 5.

In case a key 157 for processing the outside of the designated area in a photographic mode is actuated, the sequence proceeds from a step 706, 710, 714 or 716 to a step 717 for setting the flag 6.

In case a key 158 for negative image output in the designated area is actuated, the sequence proceeds from a step 706, 710, 714, 716 or 718 to a step 719 to set the flag 7.

In case a key 159 for negative image output in the outside of the designated area is actuated, the sequence proceeds from a step 706, 710, 714, 716, 718 or 720 to a step 721 to set the flag 8.

In case a key 160 for image output with a desired density in the designated area is actuated, the sequence proceeds from a step 706, 710, 714, 716, 718, 720 or 722 to a step 723 to set the flag 9.

In this manner the coordinate representing desired areas on the original image and the data corresponding to the process conditions for inside or outside of the desired area are set in the memory RAM. It is rendered possible to designate plural areas in the original image, and to select plural editing conditions for said designated areas.

FIGS. 12A and 12B are flow charts of the control sequence of the CPU 208 executed, in the original reading operation after the actuation of the start key 171, on the coordinate data and editing condition data, which are stored in the RAM of the CPU 208 according to the sequence shown in FIGS. 11A and 11B.

Upon actuation of the start key 171, the CPU 208 executes following processes according to the mode set in the RAM constituting an editing area.

At first a step 749 sets initial data, such as a character mode, a trimming mode, a no-masking mode or an intermediate density mode in the editing memory 401, 402.

Then steps 750, 751 and 752 discriminate whether the current scanning position (reading line by the CCD 103) corresponds to an editing area designated as explained above.

Also steps 753–788 discriminate the flags set in the RAM, and set bits indicating the editing conditions corresponding to said flags in the editing memory.

The steps 753 to 769 represent processes before the scanning position reaches a designated area or after the scanning position has passed the designated area, and the steps 771 to 788 represent processes while the scanning position remains in the designated area.

At first there will be explained a case in which the flag 1 is set by the actuation of the key 152. At the start of original reading, the sequence proceeds from a step 750 to 757. Upon discrimination of the flag 1 in a step 753, a step 754 is executed, until the scanning position reaches the editing area, to set the bits 1 and 0 to "1" in the entire editing memory, in order to release black signals instead of image output. Then, when a step 770 discriminates that the editing area is reached, the sequence proceeds to a step 772 for setting the editing memory in such a manner as to release the image (by setting the bit 0 to "0" and bit 1 to "1") in the editing area only and to release black signals (by setting the bit 0 to "1" and bit "1" to "0") outside said area. Subsequently when a step 752 identifies that the scanning position has passed the editing area, the sequence proceeds from a step 753 to a step 754 to set the bit 0 to "1" and bit 1 to "0" in the entire editing memory, thereby releasing black signals.

In case the flag 2 is set by the actuation of the white trimming key 153, steps 755 and 756 set the bit 0 to "1" and bit 1 to "0" in the editing memory in order to release white signals until the editing area is reached. When said area is reached, steps 773 and 774 set the editing memory so as to release the image (by setting the bit 0 to "0" and bit 1 to "0") only in said editing area and to release white signals only (by setting the bit 0 to "1" and bit 1 to "0") outside said area.

When the flag 3 is set by the actuation of the black masking key 154, steps 757 and 758 set the bit 0 to "0" and bit 1 to "1" in the editing memory in order to release the image until the editing area is reached. When said area is reached, steps 775 and 776 set the editing memory so as to release black signals in said area (by setting the bit 0 to "1" and bit 1 to 1") and to release the image outside (by setting the bit 0 to "0" and 1 to 1"). When the editing area has passed, steps 757, 758 set the bit 0 to "0" and bit 1 to "1" in the entire editing memory to release the image over the entire area.

When the flag 4 is set by the actuation of the white masking key 155, steps 759 and 760 set the bit 0 to "0" and bit 1 to "1" in the entire editing memory in order to release the image until the editing area is reached. When said area is reached, steps 777 and 778 set the editing memory so as to release white signals in the editing area only (by setting the bit 0 to "1" and bit 1 to "0") and to release the image outside (by setting the bit 0 to "0" and bit 1 to "1"). When the editing area has passed, steps 759 and 760 set the bit 0 to "0" and bit 1 to "0" in the entire editing memory, in order to release the image.

When the flag 5 is set by the actuation of the in-area photographic process key 156, steps 761 and 762 set the bit 6 to "0" in the entire editing memory in order to release the image in the character mode until the editing area is reached. When said area is reached, steps 779 and 780 set the editing memory so as to effect the photographic process only in the area (by setting the bit 6 to "1") and to adopt the character mode otherwise (by setting the bit 6 to "0"). After the editing area has passed, steps 761, 762 set the bit 6 to "0" in the editing memory in order to adopt the character mode for the entire image.

When the flag 6 is set by the actuation of the out-of-area photographic mode key 157, steps 763 and 764 set the bit 6 to "1" in order to release the image in the photographic mode until the editing area is reached. When said area is reached, steps 781, 782 set the editing memory so as to adopt the character mode (by setting the bit 6 to "0") in the editing area only and to adopt the photographic mode (by setting the bit 6 to "1") outside said area. After the area has passed, steps 763 and 764 set the bit 6 to "1" in the entire editing memory in order to process the image with the photographic mode over the entire area.

When the flag 7 is set by the actuation of the in-area negative key 158, steps 765 and 766 set the bit 2 to "0" in the entire editing memory, in order to provide a positive image until the editing area is reached. When said area is reached, steps 783, 784 set the editing memory so as to adopt the negative mode (by setting the bit 2 to "1") in the editing area only and to adopt the positive mode (by setting the bit 2 to "0") outside said area. When the area has passed, steps 765 and 766 set the bit 2 to "0" in the entire editing memory in order to release the positive image over the entire area.

When the flag 8 is set by the actuation of the out-of-area negative key 159, steps 767 and 768 set the bit 2 to "1" in the entire editing memory in order to provide a negative image until the editing area is reached. When said area is reached, steps 785 and 786 set the editing memory so as to adopt the positive mode (by setting the bit 2 to "0") in the editing area only and to adopt the negative mode (by setting the bit 2 to "1"),outside said area. When the area has passed, steps 767 and 768 set the bit 2 to "1" in the entire editing memory in order to provide a negative image over the entire area.

When the flag 9 is set by the actuation of the in-area density key 160, a step 769 sets the bits 4 and 5 to "0" in the entire editing memory, in order to obtain a density "F5" in the ordinary first gamma correction, until the editing area is reached. When said area is reached, steps 787 and 788 set the bits 4 and 5 to the values corresponding to the designated gamma correction in the editing area only, and set the bits 4 and 5 to "0" outside said area. When the area has passed, a step 769 sets the bits 4, 5 to "0" in the entire editing memory, in order to apply a first gamma correction over the entire image.

In this manner the CPU 208 sets appropriate conditions in the editing memory, corresponding to the actuated editing key and the designated area.

In the following there will be explained the method of image processing in response to the image editing data.

After the shading correction, the image data are sent to a trimming block 410 shown in FIG. 6. In the image data of the present embodiment, "FF" and "00" respectively represent black and white, and a larger number represents a higher density.

Bits 0-6 shown in FIG. 6 are image editing data supplied from the selector 405 or 406 shown in FIG. 5.

The trimming block 410 is provided with 8 sets of a circuit composed of AND gates 450, 451, an OR gate 452 and an inverter 453, said 8 sets being respectively provided for 8 bits of the digital image data. In the drawing only one set is shown for the purpose of simplicity. If the bit 0 of the image editing data supplied from the editing memory 401 or 402 is "1", the gate 450 prohibits the output of the image signal, and the information of the bit 1 of said editing memory is released as the image signal. Therefore, in the area in which the output of image data is prohibited by the bit 0, black or white output can be selected by the bit 1.

A circuit block 411 is provided with eight OR gates 454 (of which seven gates are omitted), which can forcedly turn the image signal to black in response to the state of the bit 3.

A circuit block 412 is provided with eight EX-OR gates 455 (of which seven gates are omitted), which inverts the image signal to a negative image when the bit 2 is set to "1".

A gamma-conversion ROM 413 (for example MB71) is addressed by the image data received at address lines 0-7, and releases gamma-converted signals. In the present embodiment, one of four gamma conversion tables stored in the ROM 413 in advance can be selected by the state of the bits 4 and 5.

The bit 6 is supplied, as a part of the image data, to the buffer 205.

The bit 7, not shown in FIG. 6, is used as a signal for indicating an area for effecting automatic exposure control of the original image, and is used, only when it is in the state "1", as a gate signal for automatic exposure sampling.

Figure 7:
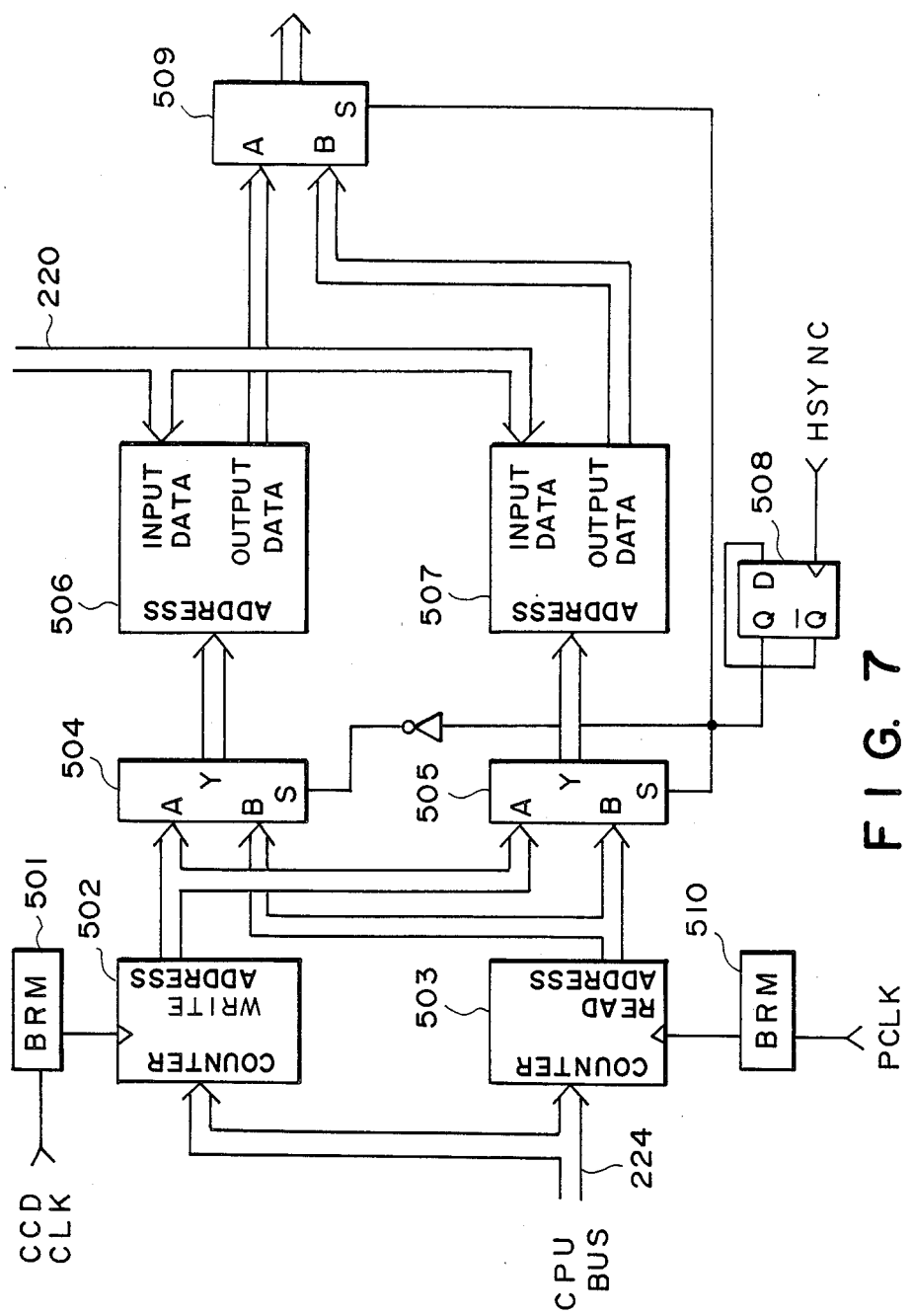
FIG. 7 is a block diagram of a buffer and a buffer control circuit.

FIG. 7 shows the details of the buffer 205 and the buffer control circuit 207 shown in FIG. 2.

The buffer memory 205 is used for enlargement, reduction or displacement of an image, or for conversion of image data synchronized with the CCD reading clock pulses (CCDCLK) into image data synchronized with the printer synchronization clock pulses (PCLK).

Image memories 506, 507, constituting a double buffer memory, are capable of each storing image data of one line, and are each composed of a memory of 8 Kbits×9.

In the following there will be explained, as an example, the operation of storing image data in the image memory 506.

When an address selector 504 selects a terminal A, addresses are supplied from a write-address counter 502 to an image memory 506 whereby image data 220 are stored therein. At the same time an address selector 505 of a memory 507 selects a read-address counter 503, and a selector 509 selects the output of the memory 507 as the image data. In a succeeding line, the reading operation and the writing operation are exchanged by the horizontal synchronization signal HSYNC so that the above-explained functions are exchanged.

In the writing operation, the CCD reading clock pulses CCDCLK may be skipped with a binary rate multiplier (BRM) (for example SN7497) for operating the write address counter 502. In this case the image memory 506 or 507 stores regularly skipped image data, and the image size is therefore reduced.

Similarly the binary rate multiplier 510 may be used for regularly skipping the clock pulses supplied to the read address counter 503, whereby the image data 221 are released in repeated manner, corresponding to thus skipped clock pulses. Consequently the image size is enlarged according to the rate of skipping.

The start addresses of the write address counter 502 and the read address counter 503 can be arbitrarily selected by the microcomputer. If both counters are set to a same start address, the image is not displaced. However the image is displaced in the main scanning direction if different start addresses are selected for both counters.

The image data 220 are given a photographic area signal of 1 bit, and are sent from the editing circuit 203 to the buffer 205 in the form of 9-bit data consisting of 8 bits of image and 1 bit of control signal. Said control signal is enlarged or reduced in the same manner as the image itself. Consequently 1:1 correspondence is retained even after the image size change. The image data and the control signal are sent, after size change, to a recording unit 210.

The recording unit 210 varies the recording characteristic according to a photograph/character control signal added to the image data of each pixel, thereby forming an image adjusted to character or photograph.

In the foregoing embodiment the control signal of 1 bit is enlarged or reduced together with the image signal, but it is also possible to enlarge or reduce plural control signals together with the image signal. In this manner it is rendered possible to send various signals corresponding to the image signals.

Also in the foregoing embodiment, an editing memory is provided for each pixel of CCD, but it is also possible to provide an editing memory for each block consisting of consecutive plural pixels, for example 8 pixels. Such structure allows to reduce the capacity of the editing memory, and to obtain a faster calculating speed in the microcomputer, though the precision of image editing is sacrificed.

In the foregoing embodiment, image editing data of 8 bits are allotted to each pixel, thereby providing several editings to each pixel. The number of bits may be increased to provide a larger number of editings, or may be decreased if the number of required editings is relatively limited.

In an image processing apparatus for editing or converting an image read from an original image, the above-explained structure allows to prevent the expansion of the hardware circuit, and to effect a size change in a position corresponding to the original image.

Though the present invention has been explained by a preferred embodiment thereof, it is not limited to such embodiment but is subjected to various modifications and variations within the scope and spirit of the appended claims.

What is claimed is:

1. An image processing apparatus comprising:
   input means for entering image data representing each of plural pixels;
   means for forming processing data of a plurality of bits corresponding to each pixel or consecutive plural pixels of the image data entered by said input means, the processing data including plural editing data each comprising at least one bit representing mutually different image process conditions; and
   process means for processing, pixel by pixel, the image data entered from said input means, based on the processing data formed by said forming means, said process means performing mutually different image processings on the image data in accordance with said plural editing data each comprising at least one bit, respectively.

2. An image processing apparatus according to claim 1, wherein said forming means comprises memory means for storing thus formed process data for at least a line, and is adapted to supply said process means with the process data from said memory means in relation to the entry of the image data from said input means.

3. An image processing apparatus according to claim 1, wherein said process means comprises plural process units for processing the image data, pixel by pixel, respectively, and each of said plural process units performs a different image processing to the image data in accordance with the associated one of said plural editing data.

4. An image processing apparatus according to claim 1, wherein said input means comprises reader means for reading an original image and generating image data representing the original image.

5. An image processing apparatus according to claim 1, further comprising setting means for setting a desired image process condition for the image represented by the image data entered from said input means, wherein said forming means is adapted to form the process data according to the image process condition thus set.

6. An image processing apparatus according to claim 1, wherein said forming means is adapted to form process data in relation to the entry of the image data from said input means.

7. An image processing apparatus according to claim 1, further comprising a pair of memory means each for storing the processing data for at least a line, wherein, while the processing data is supplied from one of said memory means to said process means, the image data formed by said forming means is stored in the other of said memory means.

8. An image processing apparatus according to claim 1, wherein at least one of the plural editing data is data indicating whether the associated image process is to be executed or not.

9. An image processing apparatus according to claim , wherein at least one of the plural editing data is data indicating an extent of the associated image process condition.

10. An image processing apparatus comprising:
    input means for entering, line by line, limage data representing each of plural pixels;
    forming means for forming process data of a plurality of bits corresponding to each pixel or consecutive plural pixels of the image data entered from said input means, the processing data including plural editing data each comprising at least one bit representing mutually different image process conditions;
    memory means for storing, at least for a line, process data formed by said forming means; and
    process means for processing the image data, line by line, entered from said input means based on the process data supplied from said memory means, said process means performing mutually different image processings on the image data in accordance with said plural editing data each comprising at least one bit, respectively.

11. An image processing apparatus according to claim 10, wherein said memory means is adapted to store process data representing plural image process conditions for each pixel or consecutive plural pixels of the image data.

12. An image processing apparatus according to claim 10, wherein said memory means is adapted to supply the process means with the process data in relation to the entry of the image data from said input means.

13. An image processing apparatus according to claim 10, wherein said input means comprises reader means for reading an original image and generating image data representing said original image.

14. An image processing apparatus according to claim 10, further comprising setting means for setting a desired image process condition for an image represented by the image data entered from said input means, wherein said forming means is adapted to form process data in accordance with the image process condition thus set.

15. An image processing apparatus according to claim 10, wherein at least one of the plural editing data is data indicating whether the associated image process is to be executed or not.

16. An image processing apparatus according to claim 10, wherein at least one of the plural editing data is data indicating an extent of the associated image process condition.

17. An image processing apparatus comprising:
    input means for entering image data representing each of plural pixels;
    means for forming process data corresponding to each pixel or consecutive plural pixels of the image data entered from said input means;
    conversion means for effecting a size conversion process on the image data entered from said input means;
    correction means for correcting the process data formed by said forming means in accordance with the size conversion process performed by said conversion means; and
    process means for processing the image data subjected to size conversion by said conversion means, based on the process data corrected by said correction means.

18. An image processing apparatus according to claim 17, wherein said input means comprises a reader for reading an original image and generating image data representing said original image.

19. An image processing apparatus according to claim 17, wherein said forming means is adapted to form process data in relation to the entry of the image data from said input means.

20. An image processing apparatus according to claim 17, wherein said conversion means is operable to increase or decrease the amount of the image data.

21. An image processing apparatus according to claim 17, further comprising setting means for setting a desired image process condition for an image represented by the image data entered from said input means, wherein said forming means is adapted to form process data in accordance with the image process condition thus set.

* * * * *

UNITED STATES PATENT AND TRADEMARK OFFICE
CERTIFICATE OF CORRECTION

PATENT NO. : 4,887,163
DATED : December 12, 1989
INVENTOR(S) : KATSUYOSHI MAESHIMA It is certified that error appears in the above-identified patent and that said Letters Patent is hereby corrected as shown below:

TITLE PAGE:

IN [62] RELATED U.S. APPLICATION DATA

"[62] Division of Ser. No. 82,660, Aug. 7, 1987, abandoned." should read --[63] Continuation of Ser. No. 82,660, Aug. 7, 1987, abandoned.--.

IN [56] REFERENCES CITED

U.S. PATENT DOCUMENTS, Insert --4,730,219  3/1988 Oshikoshi ..... 358/280--.

COLUMN 1

Line 2, "continuation-in-part" should read --continuation--.
Line 20, "highspeed" should read --high-speed--.
Line 41, "lines" should read --line--.

COLUMN 2

Line 25, "FIGS. 11A, 11B, 12A and 12B" should read --FIGS. 11A, 11B, 12A and 12B (which consists of FIGS. 12B-1 and 12B-2)--.

UNITED STATES PATENT AND TRADEMARK OFFICE
CERTIFICATE OF CORRECTION

PATENT NO. : 4,887,163

DATED : December 12, 1989

INVENTOR(S) : KATSUYOSHI MAESHIMA

It is certified that error appears in the above-identified patent and that said Letters Patent is hereby corrected as shown below:

COLUMN 5

Line 9, "has" should read --each have--.
    Line 11, "eg.," should read --e.g.,--.
    Line 45, "ondulating" should read --undulating--.
    Line 54, "but 409" should read --bus 409--.

COLUMN 7

Line 47, "bit "1"" should read --bit 1--.
    Line 68, "1")" should read --"1")--.

COLUMN 8

Line 1, "1")" should read --"1")--.

COLUMN 10

Line 49, "allows to" should read --allows one to--.
    Line 61, "allows to prevent" should read --allows one to prevent--.
    Line 66, "subjected" should read --subject--.

UNITED STATES PATENT AND TRADEMARK OFFICE
CERTIFICATE OF CORRECTION

PATENT NO. : 4,887,163

DATED : December 12, 1989

INVENTOR(S) : KATSUYOSHI MAESHIMA

Page 3 of 3

It is certified that error appears in the above-identified patent and that said Letters Patent is hereby corrected as shown below:

COLUMN 11

Line 54, ", wherein" should read --1, wherein--.
Line 58, "limage data" should read --image data--.

Signed and Sealed this

Fourth Day of June, 1991

*Attest:*

HARRY F. MANBECK, JR.

*Attesting Officer*         *Commissioner of Patents and Trademarks*